United States Patent [19]

Burdess et al.

[11] Patent Number: 4,759,220
[45] Date of Patent: Jul. 26, 1988

[54] ANGULAR RATE SENSORS

[76] Inventors: James S. Burdess, 12 Earnshaw Way, Whitley Bay, Tyne & Wear, NE25 9UN; Leonard Maunder, 46 Moorside South, Newcastle upon Tyne, NE4 9BB, both of United Kingdom

[21] Appl. No.: 841,465
[22] Filed: Feb. 28, 1986
[51] Int. Cl.[4] .................................. G01P 9/04
[52] U.S. Cl. ............................ 73/505; 73/517 A
[58] Field of Search .................. 367/138, 155, 159; 73/505, 488, 517 A, 517 R, 510

[56] References Cited

U.S. PATENT DOCUMENTS

| | | | |
|---|---|---|---|
| 3,182,512 | 5/1965 | Jones et al. | 73/505 |
| 3,309,929 | 3/1967 | Simmons et al. | 73/505 |
| 3,408,871 | 11/1968 | Borner | 73/505 |
| 3,408,872 | 11/1968 | Simmons et al. | 73/505 |
| 3,429,188 | 2/1969 | Buckley et al. | 73/505 |
| 3,719,074 | 3/1973 | Lunch | 73/505 |
| 4,079,630 | 3/1978 | Friedland et al. | 73/505 |
| 4,489,609 | 12/1984 | Burdess et al. | 73/505 |
| 4,611,490 | 9/1986 | Takeuchi | 73/505 |
| 4,655,081 | 4/1987 | Burdess | 73/505 |

FOREIGN PATENT DOCUMENTS

| | | | |
|---|---|---|---|
| 2061502 | 5/1981 | United Kingdom | 73/505 |
| 2154739 | 9/1985 | United Kingdom | 73/505 |
| 2164749 | 3/1986 | United Kingdom | 73/505 |

Primary Examiner—Thomas H. Tarcza
Assistant Examiner—Tod R. Swann
Attorney, Agent, or Firm—Kirschstein, Kirschstein, Ottinger & Israel

[57] ABSTRACT

A vibratory angular rate sensor of the kind comprising a hollow cylinder (3) secured at one end to a base (5) and free at the other end and transducers (9) on the cylinder (3) for exciting and detecting radial vibrations in the cylinder wall. The transducers (9) are positioned near the end of the cylinder (3) secured to the base (5), and the base (5) rigidly fixes the adjacent end of the cylinder (3) thereby to maximise coupling of the transducers (9) to vibrations produced in the cylinder (3) in operation of the sensor.

7 Claims, 5 Drawing Sheets

MODAL DISPLACEMENTS

MODAL STRAIN DISTRIBUTION

DILATION

MODAL DISPLACEMENTS

MODAL STRAIN DISTRIBUTION AND DILATION

ANGULAR RATE SENSORS

BACKGROUND OF THE INVENTION

FIELD OF THE INVENTION

This invention relates to vibratory angular rate sensors.

More particularly the invention relates to vibratory angular rate sensors of the kind comprising a thin-walled hollow cylinder of elastic material free at one end and nominally fixed at the other. The sensor further includes driving means for exciting predominately radial vibrations in the cylinder wall, such driving means typically comprising four piezoelectric transducers attached to the cylinder wall at equispaced circumferential positions and corresponding axial positions.

DESCRIPTION OF RELATED ART

Normally one diametrically opposite pair of the transducers constitute a driving pair of transducers and the other diametrically opposite pair of transducers are used to monitor the vibrations produced by the driving pair and stabilise the drive. In operation, when the cylinder rotates about its longitudinal axis, the predominately radial vibrations of the cylinder wall induces tangential Coriolis forces which shift the nodes of the vibrations around the circumference of the cylinder wall. This shift is detected by sensing means which typically comprises four further piezoelectric transducers mounted at equally spaced circumferential positions central between the four driving transducers, i.e. at the positions of the nodes of the vibrations produced by the driving transducers when the cylinder is stationary. The sensing means then produces an output signal proportional to the rate of turn of the sensor.

SUMMARY OF THE INVENTION

It is an object of the present invention to provide a vibratory angular rate sensor wherein the driving and sensor means are so positioned as to maximise the coupling between the driving and sensing means and the vibrations of the cylinder wall.

According to the present invention there is provided a vibratory angular rate sensor comprising: a body of elastic material having a hollow cylindrical portion of substantially uniform cross-section and wall thickness along its length and a base portion which substantially rigidly supports one end of said cylindrical portion; and driving and sensing means for exciting radial vibrations in said cylindrical portion and detecting changes in said vibrations in response to rotation of said body about the axis of said cylindrical portion characterised in that said driving and sensing means comprises transducers attached to the wall of said cylindrical portion at positions adjacent said base portion, being positions at which the integral $\int(\epsilon_{xx}+\epsilon_{\theta\theta})dx$ as hereinafter defined has a predominately negative value.

In a preferred embodiment of the invention said driving and sensing means comprises eight piezoelectric transducers attached to said cylindrical portion at equispaced circumferential corresponding axial positions around the wall of said cylindrical portion.

In such an arrangement each said transducer preferably subtends a radial angle of substantially 45°.

The base portion preferably has a cross-sectional area not less than that of the cylindrical portion.

BRIEF DESCRIPTION OF THE DRAWINGS

The invention will now be further explained and one vibratory angular rate sensor in accordance with the invention will be described, by way of example, with reference to the accompanying drawings in which.

DETAILED DESCRIPTION OF THE PREFERRED EMBODIMENTS

Figure 1:
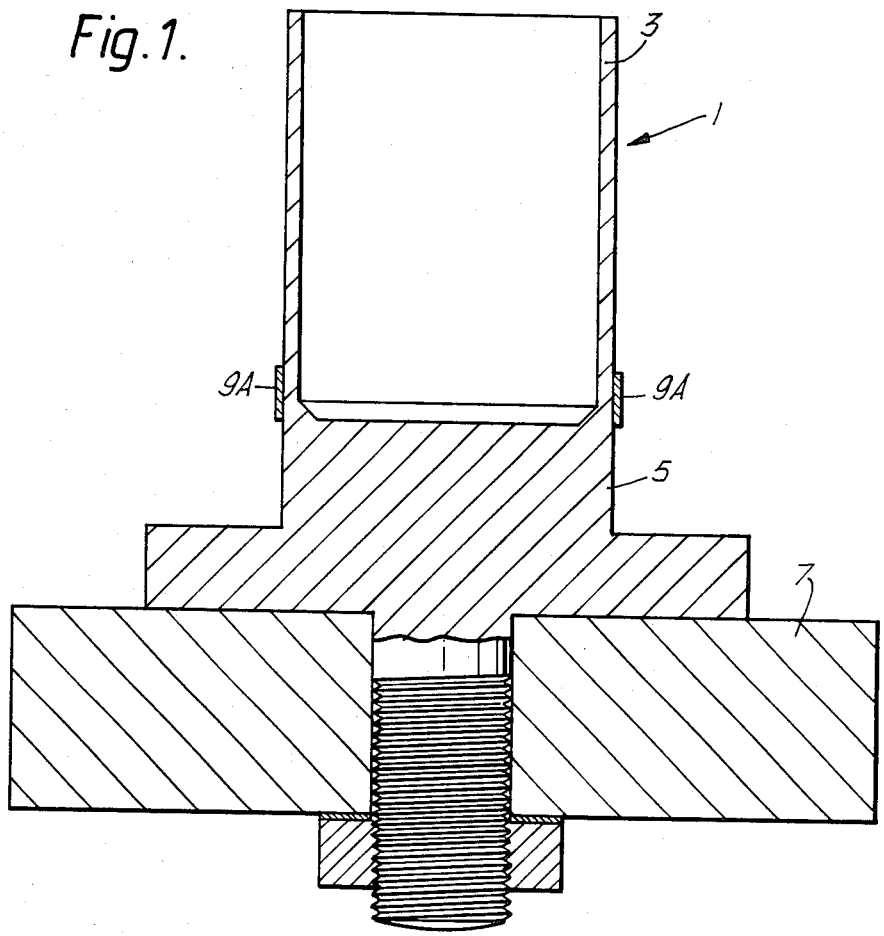
FIG. 1 is a diagrammatic sectionsl view of the sensor.

Referring to FIG. 1, the sensor comprises a member 1 of elastic material, e.g. a metal such as steel, comprising a thin-walled cylindrical portion 3 of uniform cross-section and wall thickness along its length and a base portion 5 which closes and rigidly supports one end of the cylindrical portion 3. The base portion 5 of the member 1 is rigidly bolted to a supporting plate 7.

The sensor further includes eight rectangular piezoelectric transducers 9 attached to the outside surface of the cylindrical portion 3 of the member 1 at equispaced circumferential positions, and corresponding axial positions.

Figure 2:
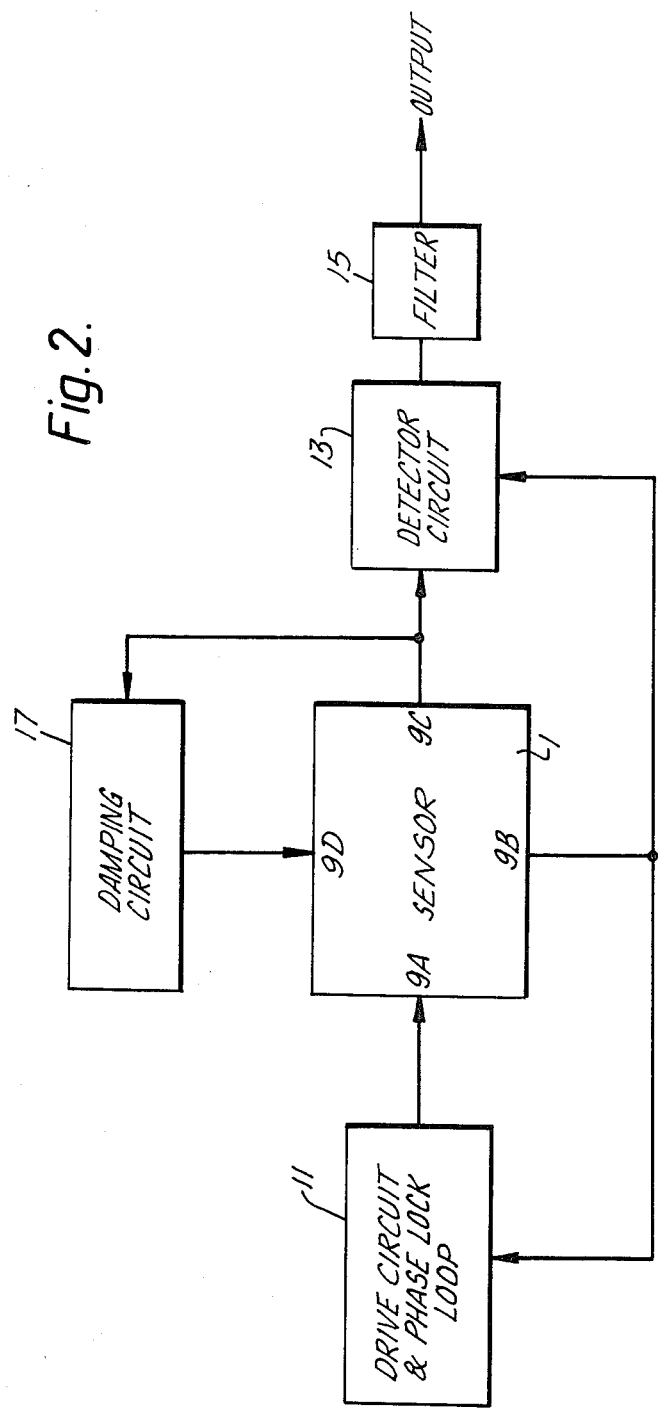
FIG. 2 is a schematic diagram of electric circuitry associated with the sensor of FIG. 1.

Referring to FIG. 2, in operation the sensor is excited to vibration by the application of voltages of approximate frequency to one diametrically opposite pair 9A of the transducers 9 from a drive circuit and phase lock loop arrangement 11. The diametrically opposite pair 9B of the transducers 9 at right angles to the drive transducers 9A monitor the vibration and provide an input to the arrangement 11 to stabilise the drive. The output of the sensor is derived by way of a detector circuit 13 and filter 15 from a third diametrically opposite pair 9C of the transducers 9, the output of the transducers 9C also being applied to the fourth diametrically opposite pair 9D of the transducers 9 via a damping circuit 17.

Figure 3:
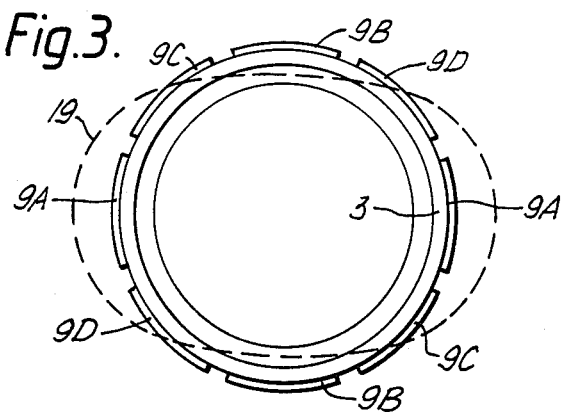
FIG. 3 is a diagrammatic plan view of the sensor, illustrating its vibration in operation.

As illustrated in FIG. 3, in operation, when the sensor is stationary, excitation of the sensor produces radial vibrations as shown, exaggerated in FIG. 3 by dotted line 19 whose nodes coincide with the positions of the output transducer pairs 9C and 9D. When the sensor rotates about the axis of the cylindrical portion 3 the radial vibrations are subject to tangential Coriolis forces. As a result the nodes of the vibrations shift around the circumference of the cylinder 3 producing an output at the output transducer pairs 9C and 9D proportional to the rate of rotation of the sensor.

The present invention resides in the choice of the positions of the transducers 9 and the form of the base portion of the sensor.

In accordance with the invention the transducers are positioned adjacent the base portion 5, instead of at the open end of the cylindrical portion 3 as is the case in conventional vibratory angular rate sensors, and the base portion 5 is arranged to secure the adjacent end of the cylindrical portion 3 rigidly, rather than in a 'hinging' fashion.

The present invention is based on an analysis of the vibrations which develop in the cylindrical portion 3, in operation, which will now be described with reference to FIG. 4, using the following notation:
- a is the mean radius of the cylindrical portion 3;
- h is the wall thickness of the cylindrical portion 3;
- l is the length of the cylindrical portion 3;
- E is Young's modulus;
- V is Poisson's ratio;
- p is the density of the material of the cylindrical portion; and
- f is natural frequency.

Figure 4:
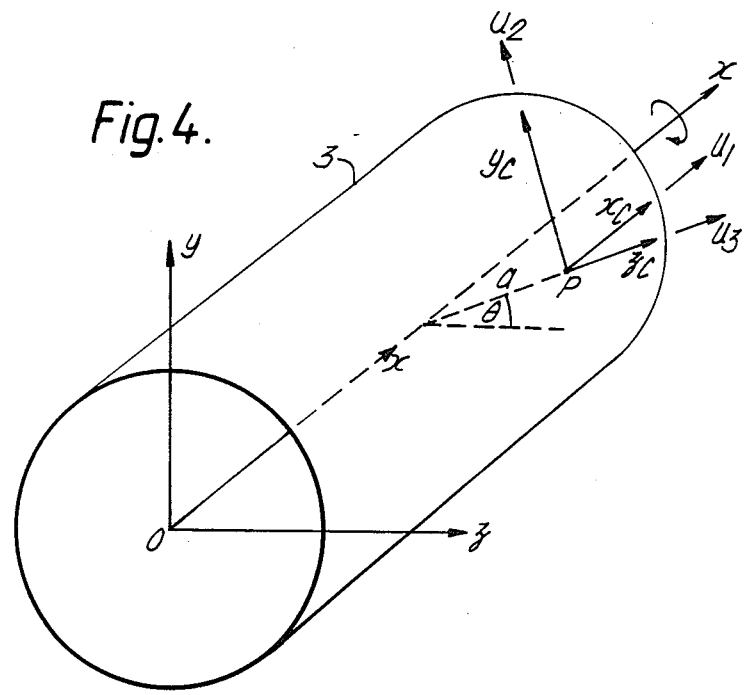
FIG. 4 is a diagram illustrating the notation used in an analysis of the operation of the sensor of FIG. 1.

FIG. 4 shows a point P fixed in the mid-surface of the cylinder 3 at a position given by the co-ordinates $(\chi,\theta)$. The local axes at P are given by $Px_c y_c z_c$, with $Px_c$ parallel to the cylinder axis Ox and $Pz_c$ along the unit outward normal at P. Axis $Py_c$ is orthogonal to $Px_c z_c$ and is longitudinal to the generating circle at P. The displacement of this point due to the deformation of the cylinder is defined by the vector $u=(u_1,u_2,u_3)$ with the components $u_i$ taken along the direction of $Px_c y_c z_c$.

The equations governing the free vibration of the cylinder are derived by solving the variational equation.

$$\delta \int (t-v) dt = 0 \tag{1}$$

In equation (1) T and V are the kinetic and strain energies and are given by:

$$T = \frac{1}{2} P h a \int_0^l \int_0^{2\pi} \{u_1^2 + u_2^2 + u_3^2\} dx d\theta \tag{2}$$

and $$V = \frac{Eha}{2(1-\gamma^2)} \int_0^l \int_0^{2\pi} \{(S_{11} + S_{22})^2 -$$

$$2(1-\gamma)\left(S_{11}S_{22} - \frac{1}{4} S_{12}^2\right)\} dx d\theta +$$

$$\frac{Eh^3 a}{24(1-\gamma^2)} \int_0^l \int_0^{2\pi} \{(K_1 + K_2)^2 -$$

$$2(1-\gamma)(K_1 K_2 - \tau^2)\} dx d\theta$$

where $$S_{11} = \frac{\partial u_1}{\partial x}$$

$$S_{22} = \frac{1}{\alpha} \frac{\partial u_2}{\partial x} + \frac{u_3}{\alpha}$$

$$S_{12} = \frac{\partial u_2}{\partial x} + \frac{1}{\alpha} \frac{\partial u_1}{\partial \theta}$$

are the direct and shear strains at the mid-surface at P and $$K_1 = -\frac{\partial^3 u_3}{dx^2}$$

$$K_2 = -\frac{1}{\alpha} \frac{\partial}{\partial \theta}\left(\frac{1}{\alpha} \frac{\partial u_3}{\partial \theta} - \frac{u_3}{\alpha}\right)$$

$$\tau = -\frac{1}{\alpha} \frac{\partial}{\partial x}\left(\frac{\partial u_3}{\partial \theta} - u_2\right)$$

are the surface curvatures and torsion at P.

To solve (1) using equations (2) we assume that the cylinder displacements can be written in the modal form.

$$U_1 = q U_1(x) \cos n\theta \sin \omega t$$

$$U_2 = q U_2(x) \sin n\theta \sin \omega t$$

$$U_3 = q U_3(x) \cos n\theta \sin \omega t \tag{3}$$

where $\omega$ is the natural frequency, n is the circumferential mode number and $U_i(x)$ are functions which describe how the displacements vary along the length of the cylinder. By choosing $U_3(x)$ such that $U_3(l)=1$ the quantity q to be interpreted as the amplitude of the radial displacement at $x=l$.

If equations (2) and (3) are substituted into (1) and the calculus of variations applied, the differential equations for $U_i(x)$ and the boundary conditions relating to the cylinder fixity at $x=0$ and determined.

The equations for $U_i$ are $$\frac{d^2 U_1}{d\xi^2} + \gamma \frac{dU_3}{d\xi} + n(1+\gamma) \frac{dU_2}{d\xi} - \frac{(1-\gamma)}{2} n^2 U_1 + \tag{4}$$

$$\rho a^2 \frac{(1-\gamma^2)}{E} \omega^2 U_1 = 0 \left\{ \frac{1-\gamma}{2} + \frac{1-\gamma}{t}\left(\frac{h}{a}\right)^2 \right\} \frac{dU_2}{d\xi^2} -$$

$$\left(n^2 + \frac{n^2}{12}\left(\frac{h}{a}\right)^2\right) U_2 - \frac{(1+\gamma)}{2} n \frac{dU}{d\xi} +$$

$$\frac{(2-\gamma)}{12} n \left(\frac{h}{a}\right)^2 \frac{d^2 U}{d^2 \xi} - \left(n + \frac{n^3}{12}\left(\frac{h}{a}\right)^2\right) U_3 +$$

$$\rho a^2 \frac{(1-\gamma^2)}{E} \omega^2 U_2 = 0 \frac{1}{12}\left(\frac{h}{a}\right)^2 \frac{d^4 U_3}{d\xi^4} -$$

$$\frac{n^2}{6}\left(\frac{h}{a}\right)^2 \frac{d^2 U_3}{d\xi^2} + \left(1 + \frac{n^4}{12}\left(\frac{h}{a}\right)^2\right) U_3 -$$

$$\frac{(2-\gamma)}{12} n \left(\frac{h}{a}\right) \frac{d^2 U}{d\xi^2} + \left(n + \frac{n^3}{12}\left(\frac{h}{a}\right)^2\right) U_2 +$$

$$\gamma \frac{dU}{d\xi} - \rho a \frac{(1-\gamma^2)}{E} \omega^2 U_3 = 0 \text{ where } \xi = \frac{x}{a}$$

For a cylinder rigidly fixed at $x=0$ and free at $x=l$ the solutions of equation (4) must satisfy the boundary conditions.

$$U_1 = 0 \tag{5}$$

$$U_2 = 0$$

$$U_3 = 0$$

$$\frac{dU_3}{d\xi} = 0 \text{ at } \xi = 0$$

and $$\frac{dU_1}{d\xi} + \gamma(U_3 + nU_2) = 0$$

-continued $$\frac{dU_2}{d\xi} - nU_1 + \frac{1}{3}\left(\frac{h}{a}\right)^2 \left(n\frac{dU_3}{d\xi} + \frac{dU_2}{d\xi}\right) = 0$$

$$\frac{d^2U_3}{d\xi} - \gamma n(nU_3 + U_2) = 0$$

$$\frac{d^3U_3}{d\xi^3} - (2-\gamma)n\left(n\frac{dU_3}{d\xi} + \frac{dU_2}{d\xi}\right) = 0 \text{ at } \xi = l$$

If root flexibility is introduced by allowing the cylinder freedom to rotate the condition $$\frac{dU_3}{d\xi} = 0$$

is replaced by $$\frac{d^2U_3}{d^2\xi} = \gamma n(nU_3 + U_2).$$

The solution to equation (4) is taken as $$U_j(\xi) = A_j \exp(\lambda\xi) \quad j = 1,2,3 \tag{6}$$

where $A_j$ and $\lambda$ are unknown constants.

Substitution into the differential equations (4) gives three linear simultaneous equations of the form $$\sum_{j=1}^{3} L_{ij}(\lambda,\omega) A_j = 0, \quad i = 1,2,3 \tag{7}$$

where the elements of the matrix L are functions of the material properties P, E and $\gamma$ and the cylinder non-dimensional parameter (n/a).

The parameter $\lambda$ follows from equation (7) on the roots of a fourth order real polynomial in $\lambda^2$ corresponding to $$det(L_{2j}) = 0 \tag{8}$$

For each $\lambda_k$ (K=1...8) determined from equation (8) the ratios $B_1 = A_1/A_3$ and $B_2 = A_2/A_3$ are found by back substitution into equation (7).

The solution of equation (6) for each $\lambda_{ve}$ are now superimposed to give $$U_j(\xi) = \sum_{K=1}^{8} a_{jk} c_K \exp(\lambda\xi) \quad j = 1,2,3 \tag{9}$$

where $a_{jk} = \begin{cases} B_1 & j = 1,2 \\ 1 & j = 3 \end{cases}$ and $C_k$ are unknown constants.

The fixing conditions at the ends of the cylinder are now used to determine $C_k$. Substitution of equation (9) into (5) yields a set of eight simultaneous linear equations of the form $$\sum_{j=1}^{8} P_{ij}C_j = 0 \quad i = 1...8 \tag{10}$$

Non trivial solutions for $C_j$ are possible only if $$det(P_{ij}) = 0 \tag{11}$$

The natural frequency $\omega$ and the factors $\lambda_k$ are determined from the simultaneous solution of equations (8) and (11). This can only be done numerically.

Once $\omega$ and $\lambda_k$ are found the ratios $C_k/C_8$ are calculated from equation (10). The function $U_j$ can now be interpreted as the axial mode shapes and can be written as $$U_j(\xi) = \epsilon \sum_{k=1}^{8} a_{jk} b_k \exp(\lambda,\xi) \quad j = 1,2,3 \tag{12}$$

where $b_k = \begin{cases} C_{k/8} & h = 1...7 \quad A12 \\ 1 & k = 8 \end{cases}$ The parameter $\epsilon$ is chosen to give $$U_3\left(\frac{l}{a}\right) = 1$$

A computer program may be written to solve equations (8) and (11) and to determine the functions $\ddot{U}_j(\xi)$ For the purposes of assessing the capability of the piezoelectric transducers to drive the cylinder and to act as pickoffs it is necessary to determine, using equations (2) and (12), the direct strain $\epsilon_{xx}$ and $\epsilon_{\theta\theta}$ at points on the outside surface of the cylinder.

These strains are given by $$\epsilon_{xx} = S_{11} + \frac{h}{2} K_1 \tag{13}$$

$$\epsilon_{\theta\theta} = S_{22} + \frac{h}{2} K_2$$

and are functions of x and $\theta$ in the form $$\epsilon_{xx} = \hat{\epsilon}_{xx} \cos n\theta$$

$$\epsilon_{\theta\theta} = \hat{\epsilon}_{\theta\theta} \cos n\theta \tag{14}$$

The quantities $\hat{\epsilon}_{xx}$ and $\hat{\epsilon}_{\theta\theta}$ may be calculated in a computer program.

Figure 5:
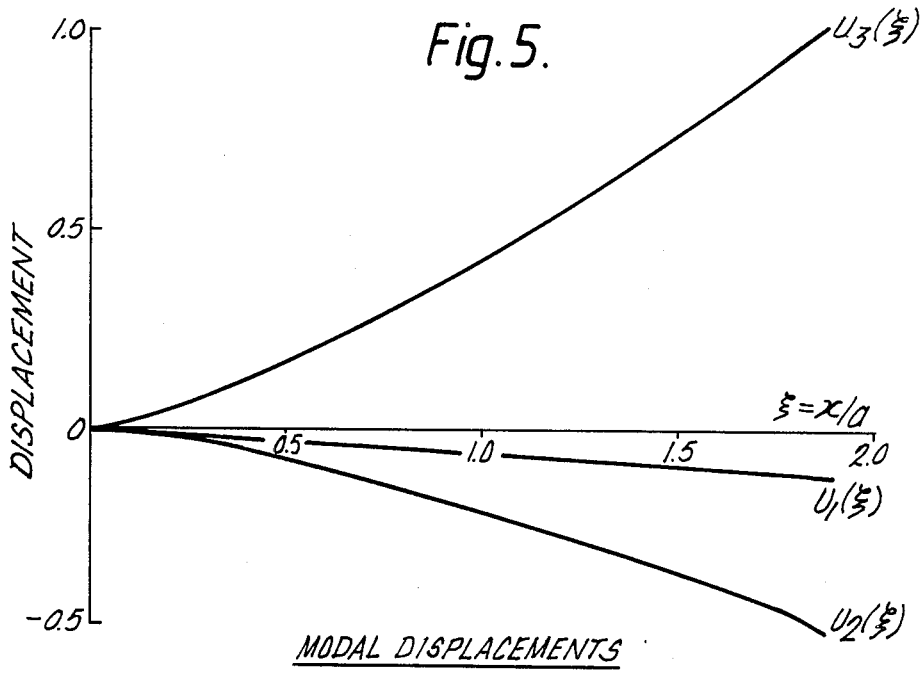
FIGS. 5, 6 and 7 are graphs illustrating displacement and strain distribution in the sensor of FIG. 1.
Figure 6:
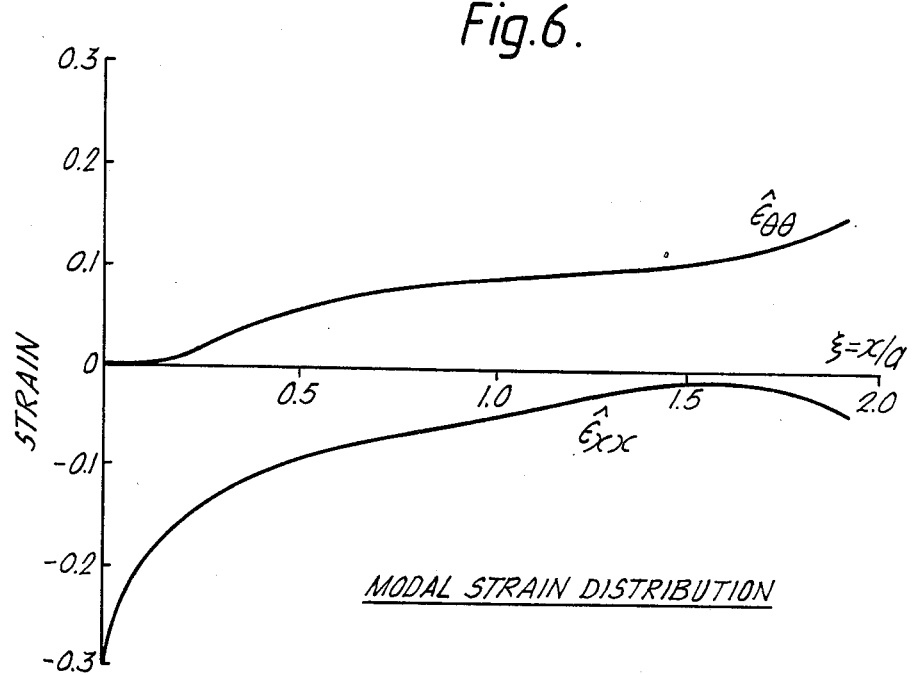
Figure 7:
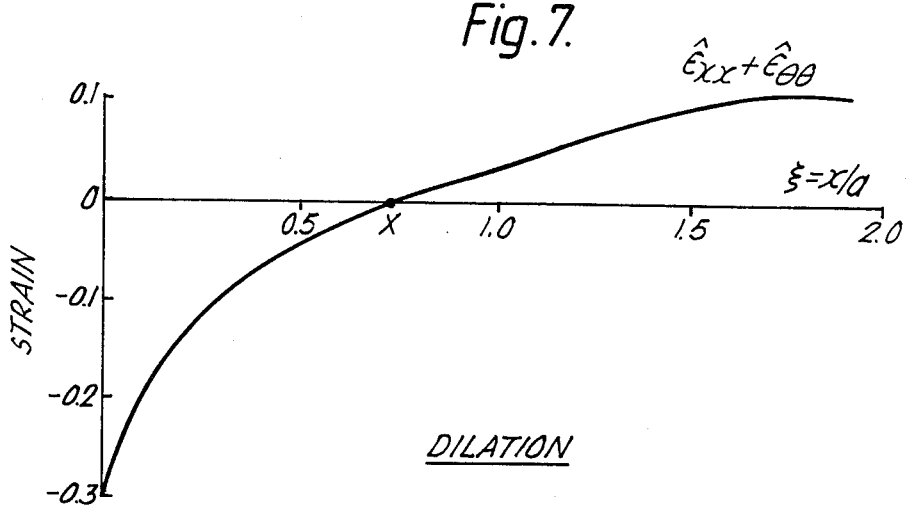

Using the above analysis, for a steel cylinder ($E = 210 \times 10^9$ n/m$^2$ and V=0.3) having h=0.5 mm a=6.25 mm and l=12 mm and having one end rigidly secured to a base, the natural frequency f of the n=2 mode is found to be 22.8 KHz. The cylinder displacements (mode shapes) and the direct strain distributions along the axis of the cylinder are found to be as shown in FIGS. 5 and 6. The dilation function ($\epsilon_{xx} + \epsilon_{\theta\theta}$), which relates to the piezoelectric coupling into the vibration mode is found to be as shown in FIG. 7.

Figure 8:
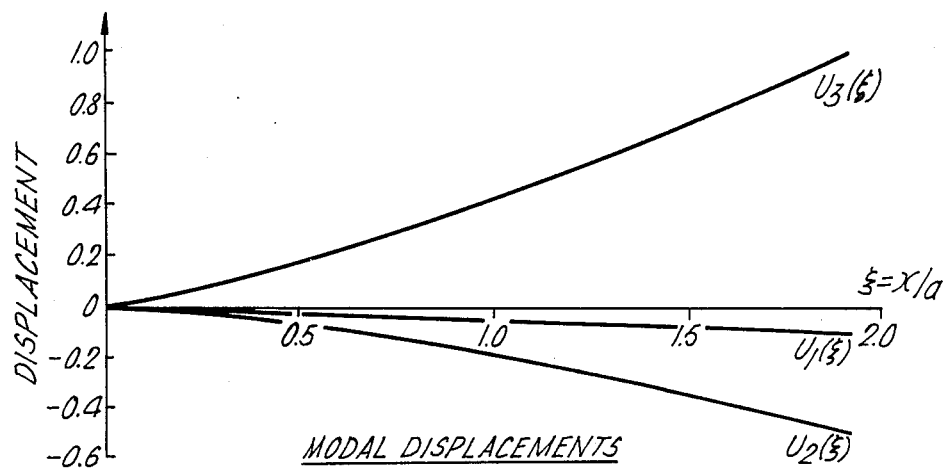
FIGS. 8 and 9 are graphs illustrating displacement and strain distribution in a sensor with no end restraint.
Figure 9:
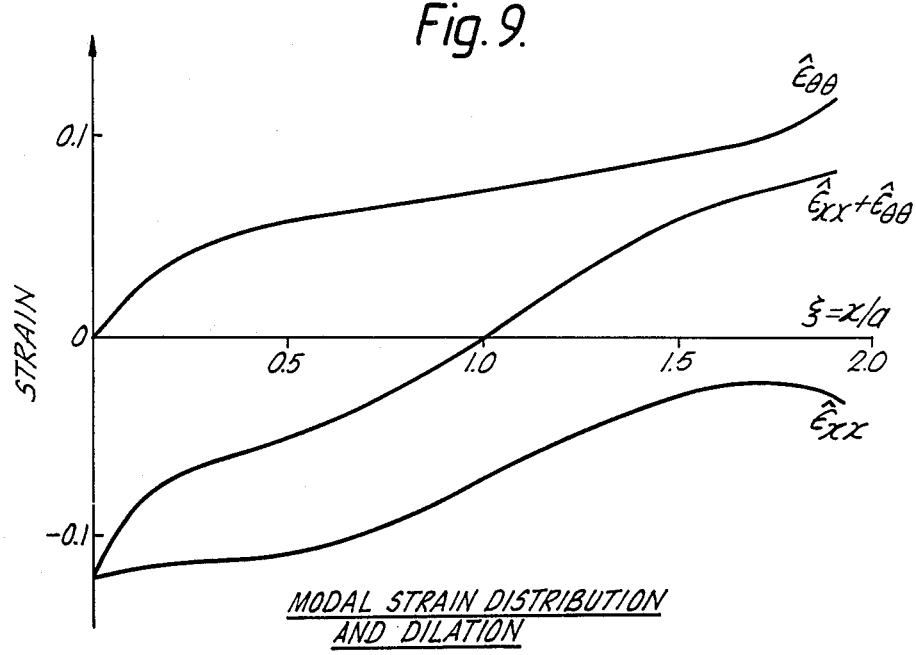

For a similar cylinder with its end attached to the base hinged to the base rather than rigidly secured thereto, the natural frequency of vibration is 8 KHz and the displacements and strain distributions are as shown in FIGS. 8 and 9.

From the foregoing the importance of base portion stiffness and its effect on the vibrational characteristics of the cylinder is clearly demonstrated. Since the cylindrical portion 3 has to be produced with repeatable dynamical characteristics it may be seen that the base portion 5 should be designed such that the root stiffness depends substantially only on material properties rather than on the detailed form of the supporting structure, i.e. the base portion should be sufficiently massive to secure the adjacent end of the cylindrical portion rigidly as illustrated in FIG. 1. To this end the base portion 5 preferably closes the end of the cylindrical portion 3 and thus has a cross-sectional area at least as great as that of the cylindrical portion 3.

In respect of the positions of the transducers the performance of the sensor can be assessed as follows:

The drive system provided by piezoelectric transducers 7 fixed to the surface of the cylindrical portion 3 can be assessed by considering the work done by a transducer 9 in exciting the n=2 mode. It can be shown, using the results given in a book entitled "Design of Resonant Piezoelectric Transducers" by R. Holland and E. P. Eer Nisse published by MIT Press, that the work function W associated with a transducer 9 can be written in the form $$W = aVe \int_A (\epsilon_{xx} + \epsilon_{\theta\theta})dxd\theta$$
$$= aVe \int (\epsilon_{xx} + \epsilon_{\theta\theta})dx \int cc32\theta d\theta \qquad (15)$$

where V is the applied voltage, e is the piezoelectric coupling coefficient, A is the area of the transducer and $(\epsilon_x, \epsilon_{\theta\theta})$ are the direct strains in the transducer. To interpret equation (15) we assume that the transducer is thin and that the strains are the same as those in the surface of the cylinder.

Clearly the coupling into the mode is determined by the value of the integrals $\int (\epsilon_{xx}+\epsilon_{\theta\theta})dx$ and $\int \cos 2\theta d\theta$ and for maximum coupling these must be as large as possible.

For each transducer 9 we have $\int \cos 2\theta d\theta$ where $\theta$ is the radial angle subtended by the transducer. Since eight transducers 9 are fixed around the circumference of the cylindrical portion $3, \theta$ is limited to $|\theta| < 45°$.

For maximum coupling $\theta$ should be close to 45°. For such a large angle the transducers 9 must be curved with a curvature matching that of the portion 3. This can be achieved, for example, by first bonding a radially polarised ring of piezoelectric material onto the surface of the cylindrical portion 3 and thereafter forming the transducers 9, by making equispaced slots in the ring at 45° increments.

The axial length of a transducer 9 and its position on the cylindrical portion 3 relative to the base portion 5 for maximum coupling is determined by the value of $\int (\epsilon_{xx}+\epsilon_{\theta\theta})dx$. FIG. 7 shows how the dilation function $(\epsilon_{xx}+\epsilon_{\theta\theta})$ varies along the length of the cylinder for a steel cylinder with dimensions a=6.25 mm, h=0.5 mm, l=12 mm. Its form indicates that coupling can be maximised in either one of two ways.

(i) If the bottom edge of a transducer 9 is aligned with the end of the cylinder 3, FIG. 7 shows that its length can be increased up to a value which positions its top edge at point X where $\hat{\epsilon}_{xx}+\hat{\epsilon}_{\theta\theta}$ is zero. In this case $\int (\epsilon_{xx}+\epsilon_{\theta\theta})dx$ will be negative. Inspection of $\hat{\epsilon}_{xx}$ and $\hat{\epsilon}_{\theta\theta}$ for this region shows that the axial strain is generally greater than the circumferential strain and and mode is being excited by introducing 'beam like' bending stresses along the length of the cylinder.

(ii) In this case the top edge of the transducer is aligned with the top of the cylinder 3. Its length can then be increased until its bottom edge is at point X. In this situation the circumferential strains are dominant and the mode is excited by introducing circumferential bending stresses which tend to distort the circular cross-section of the cylinder.

The latter case (ii) is, of course, the known conventional arrangement.

It can be seen that for transducers of length up to about 3 mm the mode is best excited by placing the transducers at the base of the cylinder 3 adjacent the base portion 5. The coupling into the mode is then about 20% greater than with the arrangement of case (ii), above.

Placing the transducers 9 adjacent the base portion 5 has the further advantage of eliminating the need for long leads to connect the transducers to the associated circuitry.

It will be appreciated that the foregoing discussion applies both to the situation where the transducers excite vibrations and the situation where the transducers act as pickoffs to detect vibrations.

The above analysis further indicates that when linear acceleration is applied along an axis perpendicular to the sensing axis, displacements of the general form $$U_1 = U_x(x,t) \cos \theta$$

$$U_2 = U_y(x,t) \sin \theta$$

and $$U_3 = U_z(x,t) \cos \theta \qquad (16)$$

will be produced.

Because of the variation with $\theta$ this motion is orthogonal with respect to the main-sensing-vibration of the cylinder 3. The functions $U_x$, $U_y$ and $U_z$ will depend upon the detailed form of the acceleration, i.e. constant or harmonic. However it can be concluded from equations (16) that these displacements will only generate error terms, i.e. produce an output indistinguishable from that generated by a rate of turn, if both the following conditions are satisfied.

(a) the acceleration has a harmonic content in the immediate neighbourhood of the cylinder operating frequency (b) the pickoff transducers are physically misaligned or electrically out of balance.

A constant acceleration will therefore not generate 'g' type errors in the same way as the traditional spinning wheel gyroscopic angular rate sensing device.

We claim:

1. A vibratory angular rate sensor comprising: a body of elastic material having a hollow cylindrical portion of substantially uniform cross-section and wall thickness along its length and a base portion which substantially rigidly supports one end of said cylindrical portion; and driving and sensing means for exciting radial vibrations in said cylindrical portion and detecting changes in said vibrations in response to rotation of said body about the axis of said cylindrical portion characterised in that said driving and sensing means comprises transducers attached to the wall of said cylindrical portion at positions adjacent said base portion, being positions at which the axial strain in said wall in operation is greater than the circumferential strain.

2. A sensor according to claim 1 wherein said driving and sensing means comprises eight piezoelectric transducers attached to said cylindrical portion at equispaced circumferential corresponding axial positions around the wall of said cylindrical portion.

3. A sensor according to claim 2 wherein each said transducer is positioned wholly to one side of a line where the axial and circumferential strains in said wall in operation are substantially equal.

4. A sensor according to claim 2 wherein each said transducer is positioned with one edge aligned with the end of said cylindrical portion supported by said base portion.

5. A sensor according to claim 2 wherein the radial angle subtended by each said transducer is substantially 45°.

6. A sensor according to claim 1 wherein said base portion has a cross-sectional area not less than that of the cylindrical portion.

7. A sensor according to claim 6 wherein said base portion closes the end of said cylindrical portion.

* * * * *